MACHINES FOR LAPPING TAPE ON TO AN ELECTRIC CONDUCTOR OR OTHER SUPPORT

Filed Feb. 24, 1958 3 Sheets-Sheet 1

*Inventors*
William Harry Charles Stark &
Kenneth William Herbert Whittington
By
Hooper, Leonard & Buell
their Attorneys Jan. 19, 1960 W. H. C. STARK ET AL 2,921,427
MACHINES FOR LAPPING TAPE ON TO AN ELECTRIC CONDUCTOR OR OTHER SUPPORT
Filed Feb. 24, 1958 3 Sheets-Sheet 2

*Inventors*
William Harry Charles Stark &
Kenneth William Herbert Whittington
By Hoopes, Leonard & Buell
their *Attorneys*

*Inventors*
William Harry Charles Stark &
Kenneth William Herbert Whittington
By
Hoopes Leonard & Buell
their Attorneys United States Patent Office 2,921,427

Patented Jan. 19, 1960

2,921,427

MACHINES FOR LAPPING TAPE ON TO AN ELECTRIC CONDUCTOR OR OTHER SUPPORT

William Harry Charles Stark, Shenfield, and Kenneth William Herbert Whittington, Barking, England, assignors to Southern United Telephone Cables Limited, Essex, England, a British company Application February 24, 1958, Serial No. 717,230

Claims priority, application Great Britain March 4, 1957

8 Claims. (Cl. 57—15)

This invention relates to the application of tape or strip material, either of metal or non-metallic (hereinafter referred to as tape) as a helical lapping on to an electric conductor or other elongated support. The invention is concerned with machines of the kind comprising a lapping head which rotates about the support as the support moves along its axis through the head, the head carrying one or more pads of the tape, and means for guiding the tape from the pad or each pad on to the support.

The invention is more particularly but not exclusively concerned with machines for lapping paper tapes on to electric conductors to form the insulated cores of telephone cables (for convenience the support will hereinafter be referred to as "a conductor"). The object of the invention is to provide a machine which can operate at a high speed and which laps the tape on to the conductor at a sufficiently constant tension.

In accordance with the invention, the pad or each pad of tape is mounted on the lapping head in such a way that the pad is free to rotate about its axis, subject only to braking continuously applied by electromagnetic means, the power supply to the electromagnetic braking means being controlled by means, responsive to variations in the path adopted by an unsupported length of the tape passing directly from the pad to a guide carried on the head in a position which is fixed relative to the pad axis, and hence responsive to change (i.e. reduction) of the pad diameter. The control means preferably comprises a potentiometer the sliding contact of which is moved by a feeler adapted to bear against the tape at a point intermediate between the pad and a guide, or the first of a series of guides, by means of which the tape is directed from the pad on to the conductor. The feeler preferably has two fingers between which the tape is passed in such a way that the feeler will be moved in response to changes of the path of the tape in either direction. The frictional resistance of the potentiometer must be sufficiently small relative to the tension in the tape to avoid deflection of the tape by the feeler fingers.

The electromagnetic braking device is also carried by the head and power is supplied to it through the potentiometer or other control means in any suitable way, for example via slip rings or equivalent means mounted on the head.

The lapping head preferably carries two pads of tape mounted on opposite sides of the conductor in such a way that they are each free to rotate about an axis approximately perpendicular to the conductor. Each pad is subjected to braking continuously applied by independent electromagnetic braking means and is provided with means for guiding the tape from the pad onto the conductor to lap the two tapes simultaneously thereon as the head rotates. Preferably the pads are mounted as closely as possible to the axis of the conductor to reduce the centrifugal force of their rotation and are arranged symmetrically so as to balance each other.

We prefer to use as the control means a small rotary type potentiometer, for example of the kind commonly used as the volume control on a wireless receiver and comprising a resistance coil, wound on an annular (or arcuate) insulating former, and a sliding contact in the form of a radial arm mounted on a spindle passing through the centre of (or centre of curvature of) the former. The potentiometer is mounted with the spindle parallel to the axis of the pad and a feeler arm is attached to and projects radially at right angles to the spindle. At the free end of the feeler arm are two parallel fingers projecting parallel to the spindle, at right angles to the arm and spaced apart by a distance slightly greater than the thickness of the tape. The arrangement is such that the unsupported part of the tape passing between the fingers adjusts the potentiometer to decrease the braking force applied to the pad as the diameter of the pad decreases.

Each pad is preferably mounted on a carrier which is free to rotate about a stub axle projecting from the taping head, approximately perpendicular to the conductor. On the side of the pad nearer to the conductor a flat ring of magnetic material is attached to the carrier, coaxial with the stub axle, and to the lapping head a ring-shaped electro-magnet, adapted to attract the flat ring, is attached. Thus when the magnet coil is energised the carrier will be braked by the attractive force between the magnet and the ring.

The head preferably carries an electric switch mounted adjacent each pad in a position in which it is actuated, directly or indirectly, by the unsupported length of tape running from the pad, shortly before the pad is exhausted. The actuation of the switch can stop the machine or give a visible or audible warning. The switch may, for example, be connected through slip rings on the head to a relay which controls the power supply to the motor driving the head. When the head carries more than one pad a switch of this kind may be associated with each pad, all of the switches being connected in parallel to the alarm or other device.

In its passage from the pad to the conductor the tape preferably passes over a spring loaded jockey pulley in such a way that sudden changes in the tension of the tape are avoided. The jockey pulley is preferably free to move, under the action of the tape and the biasing spring or springs only in a direction parallel to the axis of rotation of the head, whereby the movement of the pulley is unaffected by centrifugal force.

The invention will be further illustrated by a description of our preferred form of machine for simultaneously lapping two paper tapes on to an electric conductor, shown in the accompanying drawing, in which.

Figure 1:
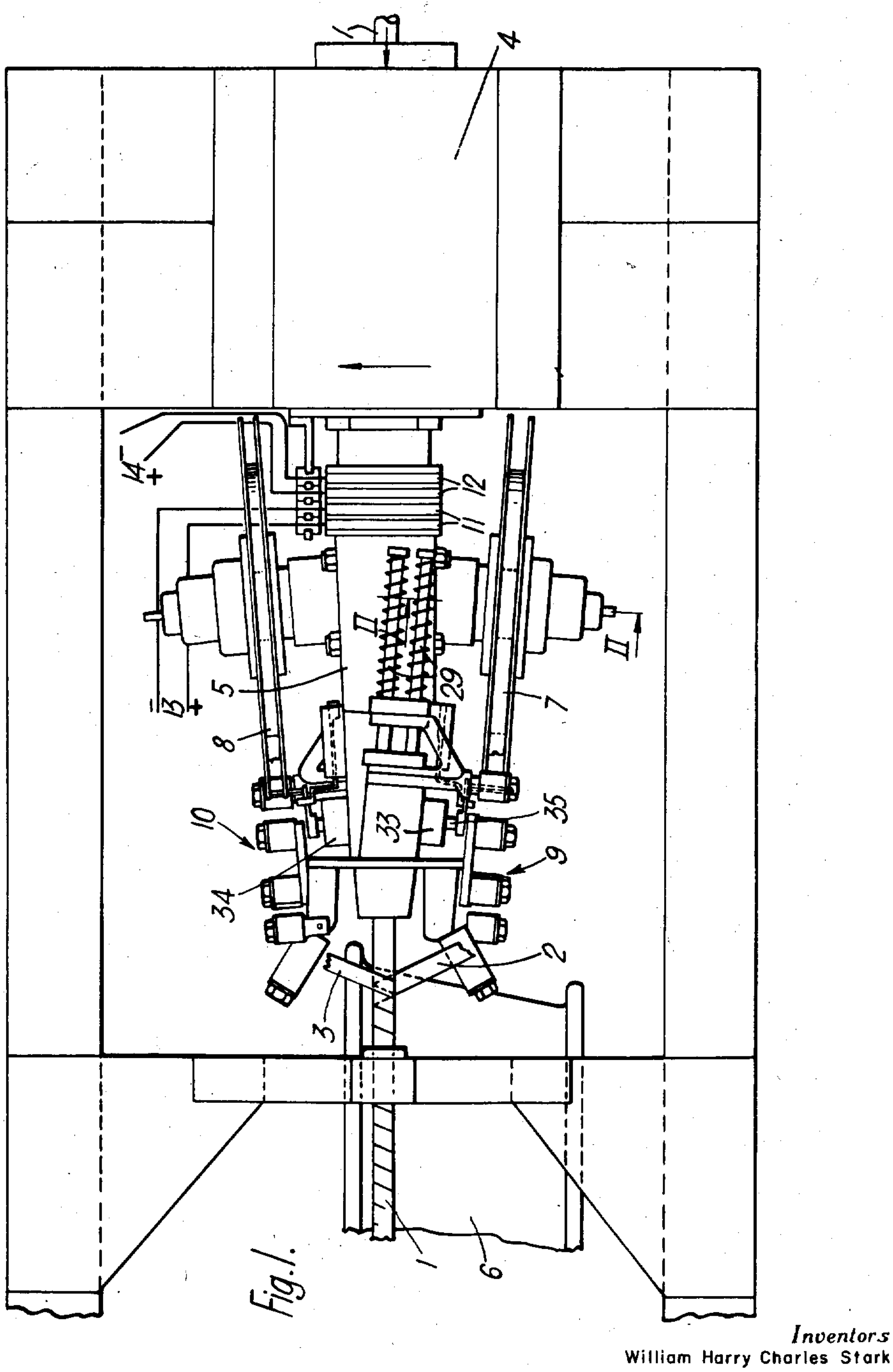
Figure 1 is a view from above of part of a machine for lapping paper tapes on to an electric conductor in which the lapping head is shown in a position in which the two pads of tape lie in vertical planes.

Referring to Figure 1, an electric conductor 1 which is to be simultaneously lapped with paper tapes 2 and 3 is drawn by a take-up capstan 6 through the lapping head and driving means 4 therefor.

The hollow spindle 5 of the lapping head carries two pads of tape 7 and 8 which are mounted in conventional carriers symmetrically on opposite sides of the head in such a way that they are each free to rotate about an axis approximately perpendicular to the conductor 1. Each of the pads 7 and 8 has an associated system of pulleys 9 and 10 mounted on the lapping head for guiding the tape from the pad on to the conductor 1 so that the tapes are lapped simultaneously on to the conductor as the head rotates.

When the head is stationary in the position described, with the tape 2 running from the top of the pad 7, the other tape 3 runs from the bottom of the second pad 8 and hence the pulley system 9 for pad 7 will be situated diametrically opposite to the pulley system 10 for the pad 8. Thus, not only the pads 7 and 8 but also the control systems 9 and 10 are symmetrically mounted on the head.

At the end of the lapping head nearer to the driving means 4 are two pairs of slip rings 11 and 12 which connect respectively the terminals 13 of a power supply to the electromagnetic braking circuits of the two pads 7 and 8 and the terminals 14 of a second power supply to pressure-sensitive switches associated with each pulley system 9 and 10 for automatically stopping a motor driving the head and capstan 6 when either pad is nearly run out.

Since the mountings of each pad and the systems of pulleys associated with each pad are identical, only pad 7 and its associated pulley system 9 will be described in detail.

Figure 2:
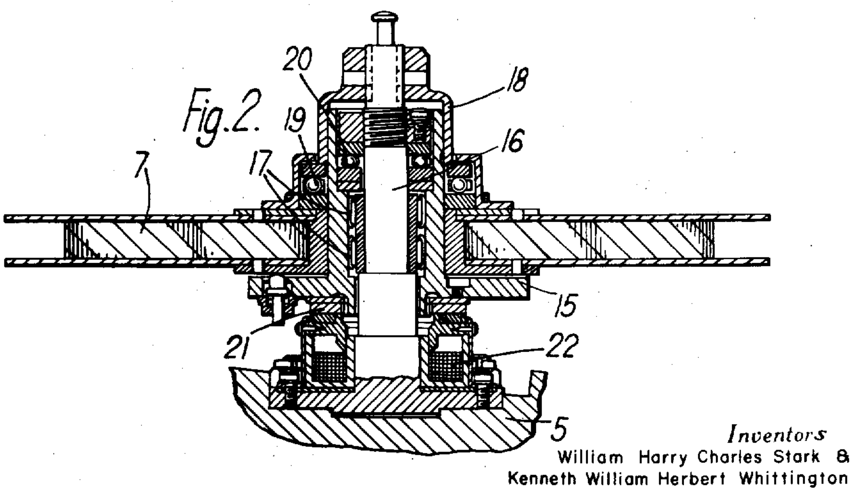
Figure 2 is a sectional view taken on the line II—II in Figure 1 showing, on an enlarged scale as compared with Figure 1, the mounting of one of the pads of tape.

Figure 2 of the drawing shows the pad 7 mounted on a carrier 15 which is free to rotate about a stub axle 16 projecting, from the hollow spindle 5 of the lapping head, approximately perpendicular to the conductor. To ensure free running, the carrier 15 is mounted on needle bearings 17 and to reduce friction, as the pad 7 is forced outwards by centrifugal force against the retaining cap 18 for the carrier, ball thrust bearings 19 and 20 are located between the cap 18 and the pad 7 and carrier 15. On the side of the pad 7 nearer to the lapping head a flat ring 21 of magnetic material is attached to the carrier 15 rotating on the needle bearings 17, coaxial with the stub axle 16 and, to the lapping head, a ring-shaped electromagnet 22 adapted to attract the flat ring 21, is attached. The coil of the magnet 22 is energised continuously so that the carrier 15 is braked continuously by the attractive force between the magnet and the ring 21, the attractive force being controlled, in a manner which will now be described, by the amount of tape on the pad 7.

Figure 3:
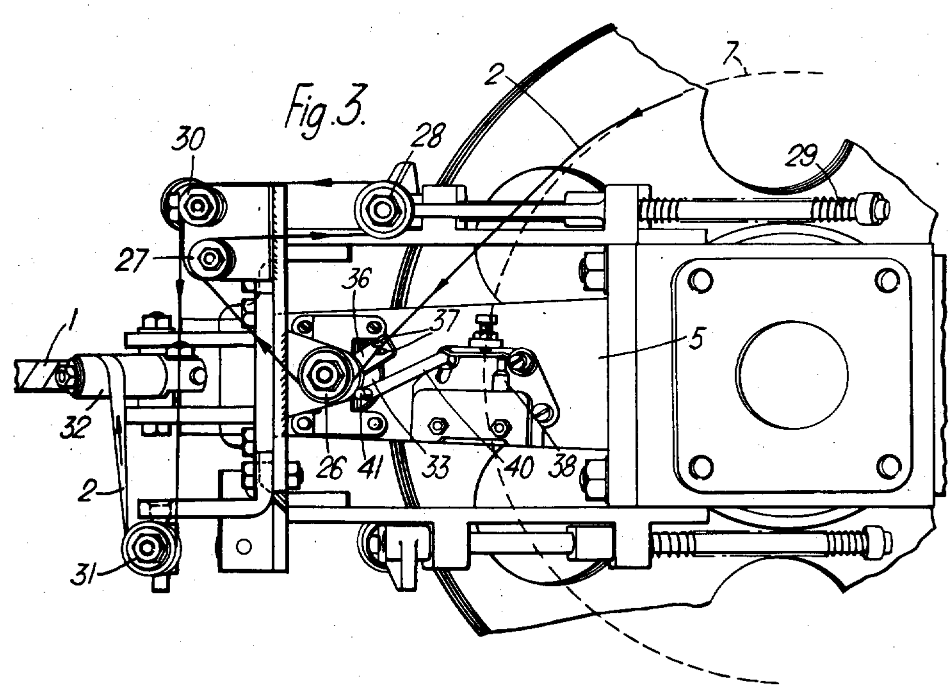
Figure 3 is a side elevation of part of the lapping head shown in Figure 1 with the nearer pad of tape and the pad mounting omitted.

Referring to Figure 3, the tape 2 passes from the top of the pad 7 under a guide pulley 26 mounted with its axis of rotation parallel to the axis of the pad and passing near to the axis of the conductor 1. From pulley 26 the tape 2 passes upwards over a pulley 27 mounted on the head with its axis parallel to that of pulley 26. From pulley 27 the tape 2 passes back towards the pad 7 over a jockey pulley 28 which is biased to move from left to right by a pair of adjustable springs 29 which can be set in accordance with the tension required in the tape. From the jockey pulley 28 the tape 2 passes horizontally to a pulley 30 and from this pulley vertically downwards over a pulley 31 mounted with its axis parallel to those of the first four pulleys. From pulley 31 the tape 2 passes over a guide roll 32 mounted on the head with its axis at such an angle to the axis of rotation of the head that the tape is guided on to the conductor 1 at the appropriate angle. All of the pulleys are mounted in such a way as to be free to rotate about their axes, the axes of all of the pulleys except the jockey pulley 28 being fixed with respect to the head, and all of the pulleys are in substantially the same plane.

A small, rotary type wire wound potentiometer 33, of the kind used as the volume control in a wireless set, is mounted near pulley 26 with its spindle 35 (Figure 1) parallel to the axis of the pad and a feeler arm 36, attached to the spindle, projects radially at right angles from the spindle. As best seen in Figure 3, at the free end of the feeler arm 36, two parallel fingers 37, spaced apart by a distance slightly greater than the thickness of the tape 2, project parallel to the spindle 35 and at right angles to the arm 36.

When the pad 7 is full, the tape 2, by its passage between the fingers 37, moves the feeler arm 36 into a position such that the resistance of the potentiometer 33 is at a minimum and maximum braking effect is applied to the pad. As the amount of tape 2 on the pad 7 decreases the feeler arm 36 is rotated in a clockwise direction in response to the change in the path of the tape, to increase the resistance of the potentiometer 33 and so to decrease the braking effect.

A pressure-sensitive electric switch 38 is mounted on the head adjacent to the pulley 26 and a second feeler arm 40 attached to the switch has at its free end a finger 41, projecting at right angles to the arm 40 parallel to the axis of the pad 7. The finger 41 is located beneath the part of the feeler arm 36 between the parallel fingers 37 and the spindle 35 such that, when the pad 7 is almost exhausted, the arm 40 will be depressed by contact between the arm 36 and the finger 41 to actuate the switch 38 and stop the motor driving the head.

Figure 4:
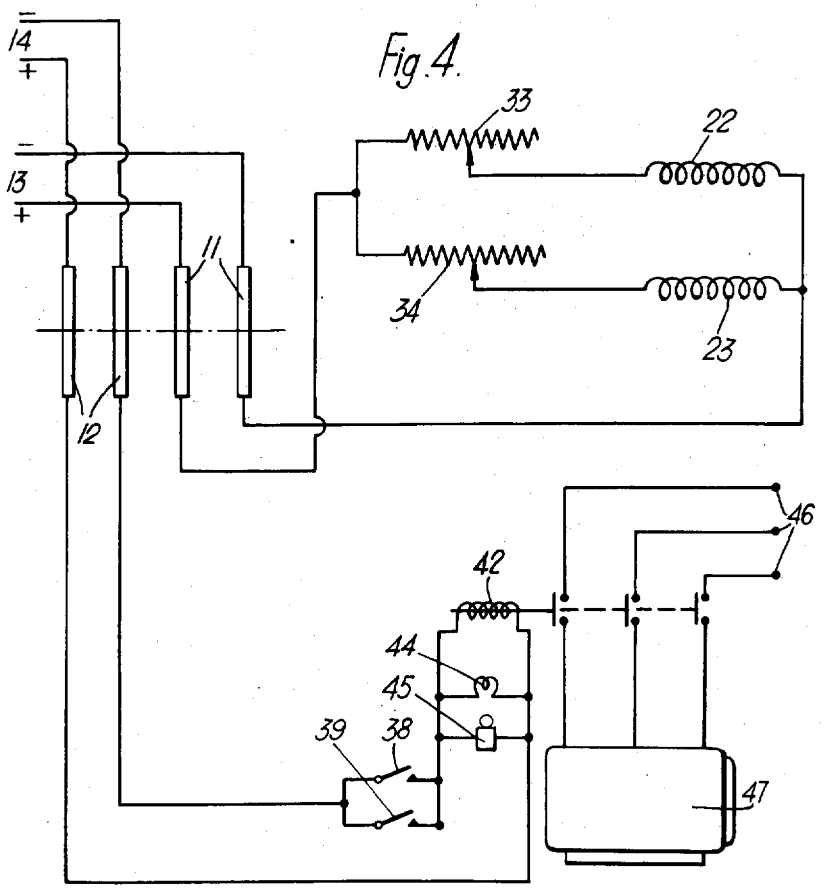
Figure 4 is a diagram of the circuit used in accordance with the invention.

Referring to the circuit diagram shown in Figure 4, the pair of slip rings 11 connect the terminals 13 of a power supply to the electromagnetic braking circuits of the two pads 7 and 8, one circuit comprising the potentiometer 33 and coil of the magnet 22 and the other circuit comprising a potentiometer 34 and the coil of a magnet 23, the two circuits being connected in parallel. The other pair of slip rings 12 connect the terminals 14 of a second power supply to the two pressure-sensitive switches 38 and 39, which are connected in parallel and associated respectively with pad 7 and pad 8, and to a three-terminal relay 42. An indicating lamp 44 and a warning bell 45 are also connected in parallel with the relay 42. The relay 42 is connected in the machine motor circuit in such a way that when one of the pads is nearly run out, the respective pressure-sensitive switch 38 or 39 is closed, the relay 42 is operated to interrupt the 3-phase supply 46 feeding the motor 47 driving the capstan 6 and the driving means 4 for the head, and the motor automatically stops.

The use of freely running pads and continuously varied electromagnetic braking enables high speed to be attained with a minimum of variation in tension and without danger of breakage of the tape.

What we claim as our invention is:

1. A machine for helically lapping tape on to a conductor, comprising a lapping head adapted to carry at least one pad of tape, take-up means for pulling the conductor through the head, means for driving the take-up means and the lapping head, electromagnetic braking means for said pad carried by the lapping head, a tape guide mounted on the lapping head in a position which is fixed relative to the pad axis and means continuously responsive to variations, caused by reductions in the pad diameter, in the path adopted by an unsupported length of said tape as it passes directly from said pad to the guide, controlling the power supply to said electromagnetic braking means, said pad being free to rotate about its axis subject only to braking continuously applied by said electromagnetic means.

2. A machine for helically lapping tape on to a conductor, comprising a lapping head adapted to carry at least one pad of tape, take-up means for pulling the conductor through the head, means for driving the take-up means and the lapping head, electromagnetic braking means for said pad carried by the lapping head, said pad being free to rotate about its axis subject only to braking continuously applied by said electromagnetic means, a tape guide mounted on the lapping head in a position which is fixed relative to the pad axis, a potentiometer with a sliding contact, carried by the head, controlling the power supply to said electromagnetic braking means and a feeler attached to said sliding contact of the potentiometer, said feeler bearing against an unsupported length of said tape, at a point intermediate between said pad and said guide, and being moved by said tape in response to variations in the path adopted by said tape.

3. A machine for helically lapping tape on to a conductor, comprising a lapping head adapted to carry two pads of tape mounted on the head on opposite sides of the conductor in such a way that they are each free to rotate about an axis approximately perpendicular to the conductor, take-up means for pulling the conductor through the head, means for driving the take-up means and the lapping head, separate, independently controlled electromagnetic braking means carried by the head for each of said pads, means for guiding each tape from said pads on to the conductor to lap the two tapes simultaneously thereon as the head rotates, including a tape guide mounted adjacent each pad in a position which is fixed relative to the pad axis and means responsive to the variations in the path adopted by an unsupported length of said tape, passing directly from each pad to said guide, controlling the power supply to said electromagnetic braking means, the rotation of each of said two pads of tape being continuously restrained by said electromagnetic braking means.

4. A machine for helically lapping tape on to a conductor, comprising a lapping head adapted to carry two pads of tape mounted on the head on opposite sides of the conductor in such a way that they are each free to rotate about an axis approximately perpendicular to the conductor, take-up means for pulling the conductor through the head, means for driving the take-up means and the lapping head, separate, independently controlled electromagnetic braking means carried by the head for each of said pads, means for guiding each tape from said pads on to the conductor to lap the two tapes simultaneously thereon as the head rotates, including a tape guide mounted adjacent each pad in a position which is fixed relative to the pad axis, a rotary type potentiometer, controlling the power supply to said electromagnetic means, mounted on the head adjacent each pad with its spindle parallel to the axis of said pad and a feeler arm, attached to and projecting at right angles from said spindle, having projecting from its free end two fingers, spaced apart by a distance greater than the thickness of said tape, the unsupported part of said tape between said pad and said guide passing between said fingers to adjust the potentiometer to decrease the braking force applied to said pad as the diameter of said pad decreases.

5. A machine for helically lapping tape on to a conductor, comprising a lapping head adapted to carry at least one pad of tape, said pad of tape being mounted on a carrier which is free to rotate about an axle projecting from the head approximately perpendicular to the conductor, a flat ring of magnetic material being attached to said carrier coaxial with said axle on the side of the pad nearer to the conductor and a ring-shaped electromagnet, adapted to attract the flat ring, being attached to the lapping head, the carrier being braked by the attractive force between the magnet and the ring when the magnet coil is energised, take-up means for pulling the conductor through the head, means for driving the take-up means and the lapping head, a tape guide mounted on the lapping head in a position which is fixed relative to the pad axis and means responsive to variations in the path adopted by an unsupported length of said tape, passing directly from said pad to the guide, controlling the power supply to said electromagnetic braking means, said pad being free to rotate about its axis subject only to braking continuously applied by said electromagnetic means.

6. A machine for helically lapping tape on to a conductor, comprising a lapping head adapted to carry at least one pad of tape, take-up means for pulling the conductor through the head, means for driving the take-up means and the lapping head, electromagnetic braking means for said pad carried by the lapping head, said pad being free to rotate about its axis subject only to braking continuously applied by said electromagnetic means, a tape guide mounted on the lapping head in a position which is fixed relative to the pad axis, means responsive to variations in the path adopted by an unsupported length of said tape, passing directly from said pad to the guide, controlling the power supply to said electromagnetic braking means, an electric switch mounted on the lapping head adjacent each pad, means for actuating said switch responsive to contact with said unsupported length of the tape shortly before said pad is exhausted and a circuit for stopping the means for driving the take-up means and the lapping head on actuation of said switch.

7. A machine as claimed in claim 6, in which the electric switch is connected through slip rings on the head to a relay which controls the power supply to a motor driving the head and the take-up means.

8. A machine for helically lapping tape on to a conductor, comprising a lapping head adapted to carry at least one pad of tape, take-up means for pulling the conductor through the head, means for driving the take-up means and the lapping head, electromagnetic braking means for said pad carried by the lapping head, said pad being free to rotate about its axis subject only to braking continuously applied by said electromagnetic means, a tape guide mounted on the lapping head in a position which is fixed relative to the pad axis, a jockey pulley mounted on the head adjacent said pad in the path of the tape between said guide and the conductor and spring loaded in such a way as to compensate for sudden changes in tension of said tape, said jockey pulley being free to move under the action of said tape and the biasing springs, only in a direction parallel to the axis of rotation of the head and means responsive to variations in the path adopted by an unsupported length of said tape, passing directly from said pad to said guide, controlling the power supply to said electromagnetic braking means.

References Cited in the file of this patent

UNITED STATES PATENTS

| | | |
|---|---|---|
| 621,735 | Arnold | Mar. 21, 1899 |
| 1,830,669 | Loomis | Nov. 3, 1931 |
| 1,997,626 | Caldes | Apr. 16, 1935 |
| 2,077,183 | Parvin | Apr. 13, 1937 |
| 2,279,115 | Ewaldson et al. | Apr. 7, 1942 |